United States Patent [19]
Arimilli et al.

[11] Patent Number: 5,860,101
[45] Date of Patent: Jan. 12, 1999

[54] SCALABLE SYMMETRIC MULTIPROCESSOR DATA-PROCESSING SYSTEM WITH DATA ALLOCATION AMONG PRIVATE CACHES AND SEGMENTS OF SYSTEM MEMORY

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 992,785

[22] Filed: Dec. 17, 1997

[51] Int. Cl.[6] ..................................... G06F 12/08
[52] U.S. Cl. ..................... 711/121; 711/153; 711/173; 711/206; 711/208; 711/209; 711/216
[58] Field of Search ................. 711/1, 117, 118, 711/119, 120, 121, 122, 141, 147, 150, 153, 170, 173, 206, 207, 208, 209, 216, 221; 395/200.1, 830

[56] References Cited

U.S. PATENT DOCUMENTS

| | | | |
|---|---|---|---|
| 4,646,237 | 2/1987 | Allen | 395/287 |
| 4,755,930 | 7/1988 | Wilson, Jr. et al. | 711/122 |
| 4,881,164 | 11/1989 | Hailpern et al. | 711/207 |
| 4,969,122 | 11/1990 | Jensen | 365/49 |
| 5,247,648 | 9/1993 | Watkins et al. | 711/143 |
| 5,303,362 | 4/1994 | Butts, Jr. et al. | 711/121 |
| 5,329,630 | 7/1994 | Baldwin | 711/173 |
| 5,353,430 | 10/1994 | Lautzenheiser | 711/117 |
| 5,604,882 | 2/1997 | Hoover et al. | 711/121 |
| 5,664,152 | 9/1997 | Ezzet | 711/153 |
| 5,680,571 | 10/1997 | Bauman | 711/122 |
| 5,684,993 | 11/1997 | Willman | 395/677 |
| 5,694,567 | 12/1997 | Bourekas et al. | 711/3 |

*Primary Examiner*—Tod R. Swann
*Assistant Examiner*—J. Peikari
*Attorney, Agent, or Firm*—Volel Emile; Antony P. Ng; Andrew J. Dillon

[57] ABSTRACT

A scalable symmetric multiprocessor data-processing system is disclosed. The symmetric multiprocessor data-processing system includes multiple processing units and a system memory. Each of the processing units includes a cache memory for storing a subset of data contained within the system memory. A cache controller is included within each one of the processing units for controlling an associated cache memory. The cache controller contains a mode select to allow an associated cache memory to be selectively operated under either a first mode or a second mode. Furthermore, the symmetric multiprocessor data-processing system also includes a multiple of partial system memories, wherein each of the partial system memories is associated with one of the processing units such that an aggregate of contents within all of the partial system memories forms the system memory.

5 Claims, 3 Drawing Sheets

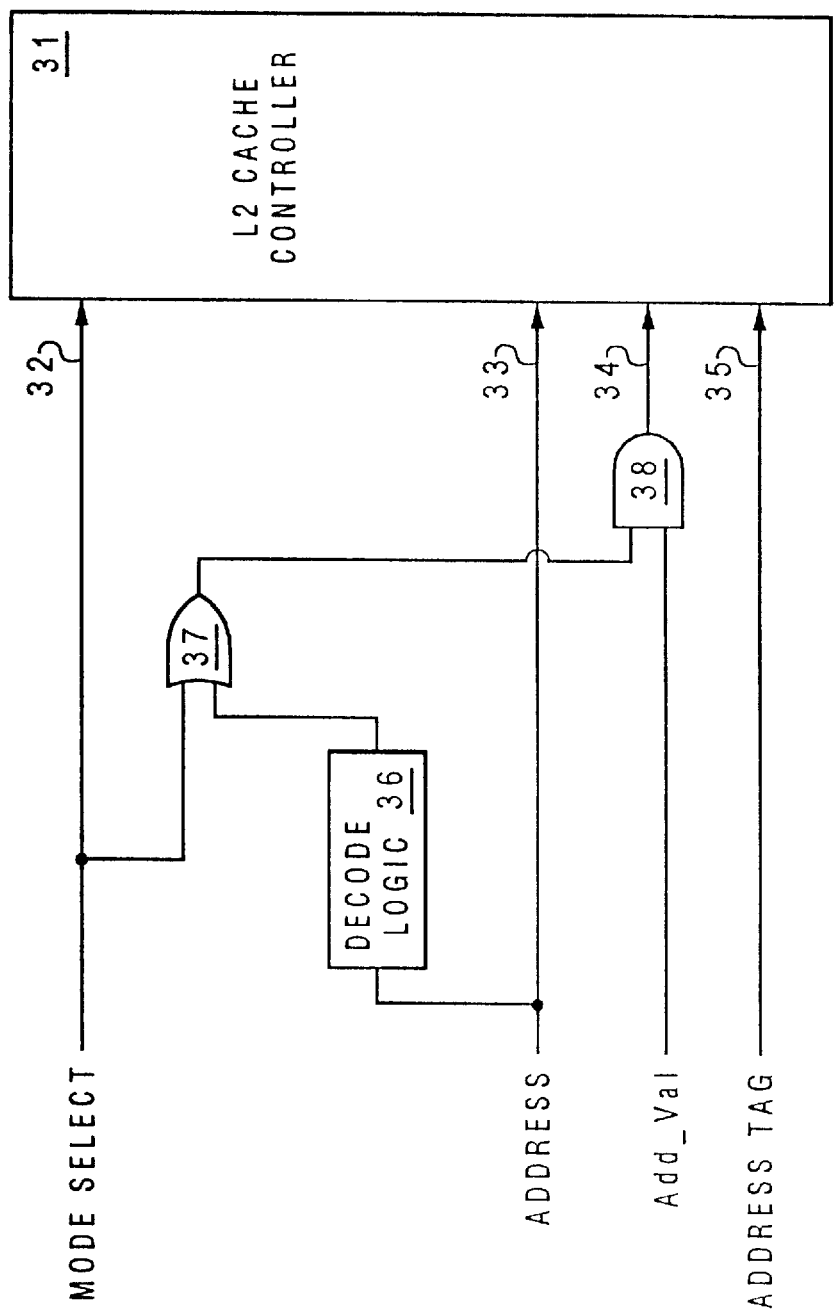

SCALABLE SYMMETRIC MULTIPROCESSOR DATA-PROCESSING SYSTEM WITH DATA ALLOCATION AMONG PRIVATE CACHES AND SEGMENTS OF SYSTEM MEMORY

RELATED PATENT APPLICATION

This patent application is related to a copending application U.S. Ser. No. 08/992,134 filed on even date, entitled "SYSTEM AND METHOD FOR ENHANCING CACHE MEMORY UTILIZATION WITHIN A SYMMETRIC MULTIPROCESSOR DATA-PROCESSING SYSTEM" (IBM Docket No. AT9-97-425), and a copending application U.S. Ser. No. 08/992,786 filed on even date, entitled "SYSTEM AND METHOD FOR INCREASING SYSTEM MEMORY BANDWIDTH WITHIN A SYMMETRIC MULTIPROCESSOR DATA-PROCESSING SYSTEM" (IBM Docket No. AT9-97-427).

BACKGROUND OF THE INVENTION

1. Technical Field

The present invention relates to a system for data processing in general and, in particular, to a symmetric multiprocessor data-processing system. Still more particularly, the present invention relates to a scalable symmetric multiprocessor data-processing system.

2. Description of the Prior Art

A typical symmetric multiprocessor (SMP) data-processing system has several processing units; and all of these processing units are generally identical. In other words, all the processing units have the same architecture and utilize a common set or subset of instructions and protocols to operate. Furthermore, each processing unit includes a processor core having at least one execution unit for carrying out program instructions. In addition, each processing unit may include at least one level of caches, commonly referred to as L1 or primary caches, which are implemented with high-speed memories. In most cases, a second level of caches, commonly referred to as L2 or secondary caches, may be included in each processing unit for supporting the first level caches. In some cases, a third level of caches, commonly referred to as L3 or tertiary caches, may also be included in each processing unit for supporting the second level caches. Each level of cache stores a subset of the data and instructions contained in a system memory for low latency access by the processor cores.

Despite various advantages, the scalability of a typical SMP data-processing system tends to be limited and the size of the typical SMP data-processing system is also intrinsically defined. However, in today's computing world, it is imperial to have an expandable data-processing system that can meet all the ever-growing computing demands. Consequently, it would be desirable to provide an improved SMP data-processing system architecture such that the entire system is truly scalable.

SUMMARY OF THE INVENTION

In view of the foregoing, it is therefore an object of the present invention to provide an improved system for data processing.

It is another object of the present invention to provide an improved symmetric multiprocessor data processing system.

It is yet another object of the present invention to provide a scalable symmetric multiprocessor data-processing system.

In accordance with a preferred embodiment of the present invention, a symmetric multiprocessor data-processing system includes multiple processing units and a system memory. Each of the processing units includes a cache memory for storing a subset of data contained within the system memory. A cache controller is included within each one of the processing units for controlling an associated cache memory. The cache controller contains a mode select to allow an associated cache memory to be selectively operated under either a first mode or a second mode. Furthermore, the symmetric multiprocessor data-processing system also includes a multiple of partial system memories, wherein each of the partial system memories is associated with one of the processing units such that an aggregate of contents within all of the partial system memories forms the entire system memory.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a block diagram of an apparatus for providing a mode select for enhancing cache memory utilization within a SMP data-processing system, in accordance with a preferred embodiment of the present invention.

DETAILED DESCRIPTION OF A PREFERRED EMBODIMENT

The present invention may be applicable to any symmetric multiprocessor (SMP) data-processing system in which each processing unit has at least one associated local cache memory.

Figure 1:
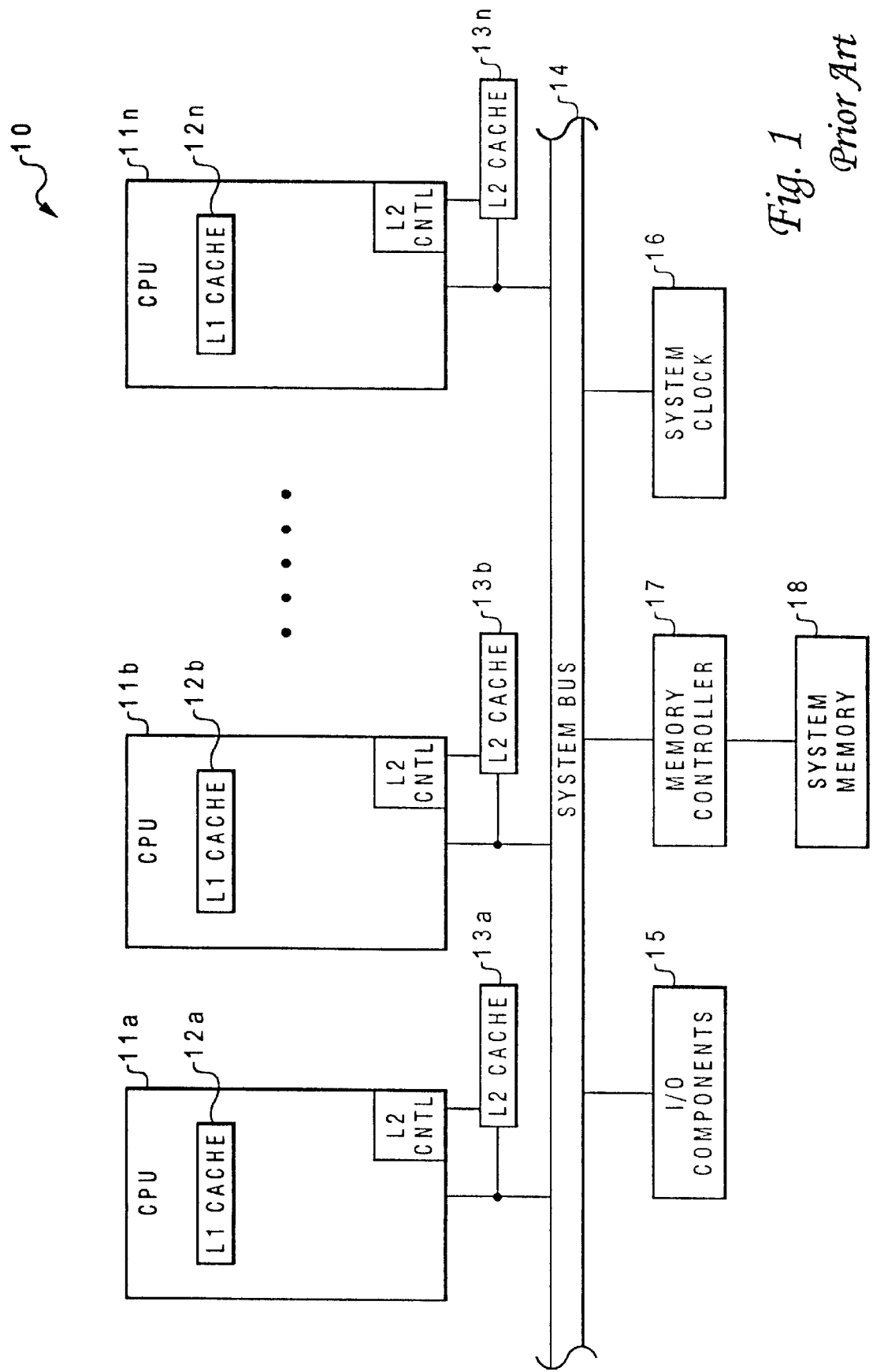
FIG. 1 is a block diagram of a SMP data-processing system in accordance with the prior art.

Referring now to the drawings and, in particular, to FIG. 1, there is depicted a block diagram of a SMP data-processing system 10 in accordance with the prior art. SMP data-processing system 10 includes multiple central processor units (CPUs) 11a–11n, and each of CPUs 11a–11n contains as least one level of local cache. As shown, CPU 11a contains a primary cache 12a, CPU 11b contains a primary cache 12b, and CPU 11n contains a primary cache 12n. In addition, each of CPUs 11a–11n also includes an L2 cache controller for controlling a corresponding one of secondary caches 13a–13n.

All CPUs 11a–11n are coupled to an interconnect such as a system bus 14. A system clock 16 is coupled to system bus 14 for supplying clock signals to all the components within SMP data-processing system 10, including I/O components 15. In addition, a system memory 18 is coupled to system bus 14 via a memory controller 17. System memory 18 contains various instructions and data for the normal operations of SMP data-processing system 10.

A typical size allocation for each level of memory hierarchy within SMP data-processing system 10 is as follows. Each primary cache is 64 KBytes total in size, with 32 KBytes for instruction-caching and 32 KBytes for data-caching. Each secondary cache is 4 MBytes. The system memory is approximately 4 GBytes. The latency associated with accessing each level of the memory hierarchy is typically one processor-clock cycle, five processor-clock cycles, and 65 processor-clock cycles for the primary cache, the secondary cache, and the system memory, respectively.

Based on these access times, it would be advantageous to reduce the frequency of system memory accesses as much as possible in order to maintain a high system performance. This can be accomplished by maintaining as much useful data (and/or instructions) in at least one of the cache memories as possible. In other words, by maintaining a relatively high cache "hit" ratio.

When system memory accesses are unavoidable, however, degradation of system performance may be prevented by increasing the bandwidth of the system memory. In the prior art, the width of primary caches 12a–12n is typically two to four words wide in order to coincide with the access bandwidth of CPUs 11a–11n accordingly. By the same token, the width of system memory 18 is also two to four words wide to coincide with the width of the interconnect of primary caches 12a–12n. With this prior art configuration, it is quite difficult to increase the bandwidth of system memory 18 without adding additional hardware such as bus wide conversion logic between system bus 14 and system memory 18. However, this type of hardware tends to slow down accessing speed to system memory 18 such that the advantage gained from a wider bandwidth may be neutralized.

Figure 2:
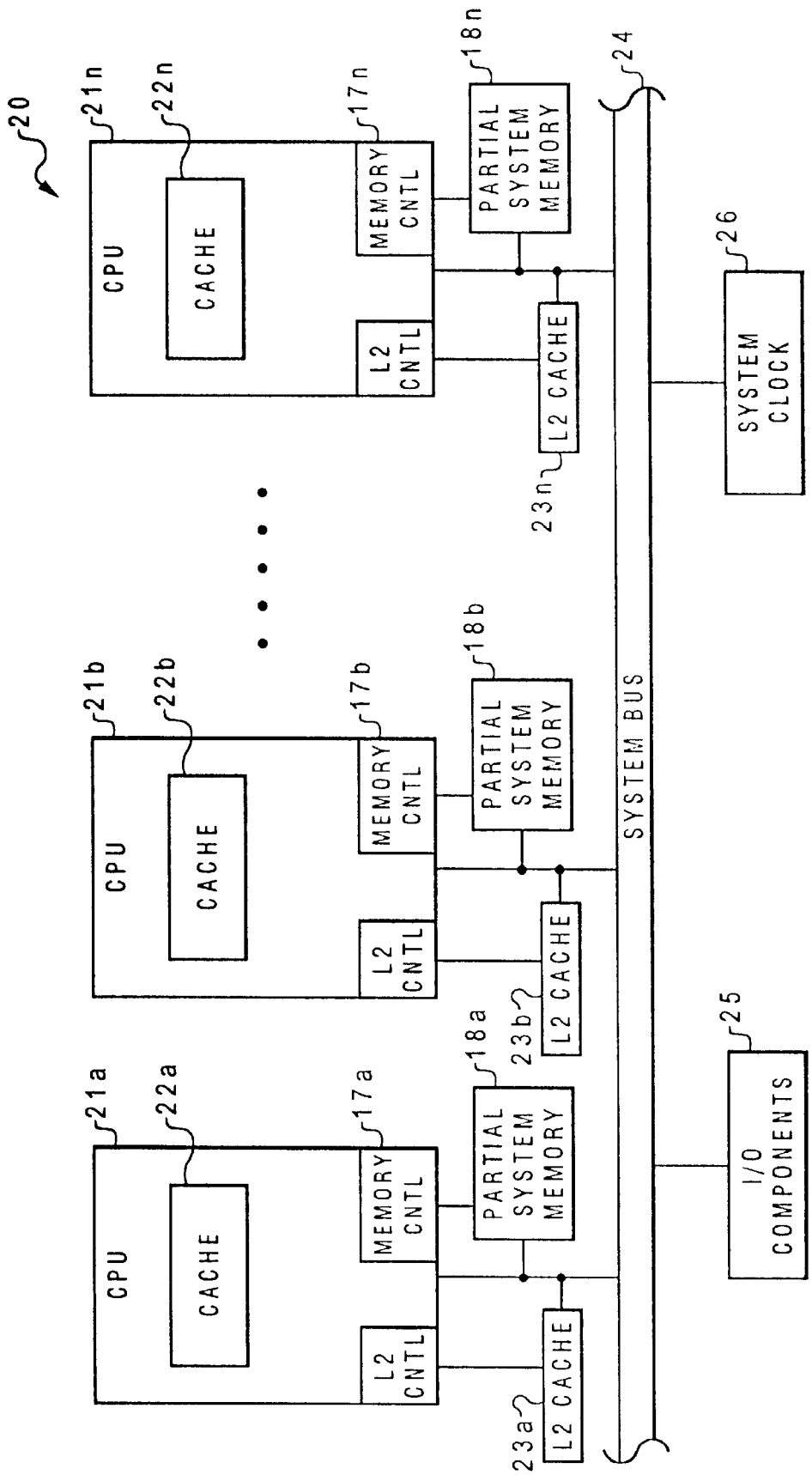
FIG. 2 is a block diagram of a SMP data-processing system in accordance with a preferred embodiment of the present invention.

With reference now to FIG. 2, there is depicted a block diagram of a SMP data-processing system 20 in accordance with a preferred embodiment of the present invention. SMP data-processing system 20 includes multiple central processor units (CPUs) 21a–21n, and each of CPUs 21a–21n contains as least one level of local cache. As shown, CPU 21a contains a primary cache 22a, CPU 21b contains a primary cache 22b, and CPU 21n contains a primary cache 22n. In addition, each of CPUs 21a–21n also includes an L2 cache controller for controlling a corresponding one of secondary caches 23a–23n.

All CPUs 21a–21n are coupled to an interconnect such as a system bus 24. For enhanced scalability, the interconnect may also be implemented by utilizing a cross-bar switch. A system clock 26 is coupled to system bus 24 for supplying clock signals to all the components within SMP data-processing system 20, including I/O components 25.

For the purpose of illustration, a CPU and a primary cache (such as CPU 21a and primary cache 22a as depicted in FIG. 2) may be collectively known as a processing unit. Although a preferred embodiment of an SMP data-processing system is described in FIG. 2, it should be understood that the present invention can be practiced within a variety of SMP data-processing system configurations. For example, a secondary and even a tertiary cache may be included within each processing unit of the SMP data-processing system.

Broadly speaking, there is a natural dichotomy in the number of ways a software program may be executed within a SMP data-processing system. For example, when a program is very large, the execution of the program may be distributed among all the processing units within the SMP data-processing system such that the processing units are accessing common areas of system memory space. In such a case, the data within each local cache are most likely to be shared or required by other processing units within the SMP data-processing system. On the other hand, when each processing unit is executing a different program, it is most likely that the data in the local caches are only required by the associated local processing unit such that there is probably little data sharing between processing units within the SMP data-processing system.

Accordingly, the present invention provides a method to enhance the utilization of cache memories within an SMP environment in order to accommodate different styles of program execution, such as those mentioned above. In the case in which data-sharing is normally demanded, it is beneficial to have cache memories at the lowest level (e.g., the L2 caches in FIG. 2) to behave as a single shared cache so as to avoid duplicate data storage in more than one cache memory. On the other hand, in the case in which data-sharing is normally not demanded, it is beneficial to have the data pertaining to the local processing unit to remain within the cache memories associated with the local processing unit as much as possible, instead of storing the data in a cache memory associated with another processing unit. In light of that, the present invention provides a mode select for each cache memory within a SMP data-processing system. The mode selection is preferably between a shared mode and a private mode. For the purpose of illustration, only L2 caches are utilized to explain the present invention; however, it is understood that the principle of the present invention may be applicable to any level of cache memories.

In a shared mode, all L2 caches within the SMP data-processing system are logically combined, each representing different segments of the system memory. For example, if there are a total of four L2 caches within the SMP data-processing system, then these four L2 caches are logically combined to represent four different segments that together can represent the total address space of the system memory. These four segments may or may not be contiguous but they must be from different address spaces of the system memory. From the stand point of each processing unit within the SMP data-processing system, all four L2 caches become one "giant" L2 cache. In other words, if each of the L2 caches is four MBytes in size, then in the shared mode, each processing unit will essentially have a 16 MBytes L2 cache representing the entire address space of the system memory. Data stored in a non-local L2 cache will be transferred to a requesting processing unit by intervention protocol via the interconnect. In essence, in the shared mode, the more L2 caches which are added to the SMP data-processing system, the more total L2 cache spaces all processing units effectively have. As such, the overall cache "hit" ratio should be higher than when each L2 cache operates independently.

In a private mode, each L2 cache may individually store data from any location within the system memory. At any point in time, one or more L2 caches may contain shared copies of the same data. From a processing unit stand point, each processing unit retains its own local L2 cache. In other words, if there are four L2 caches within the entire SMP data-processing system and each of the four L2 caches is four MBytes in size, then in the private mode, each processing unit will essentially have four MBytes of L2 cache capable of caching data from any location within the system memory. Intervention may still be performed in the private mode, though the frequency of intervention is expected to be lower than in the shared mode.

Referring now to FIG. 3, there is depicted a block diagram of an apparatus for providing a mode select for enhancing cache memory utilization within a SMP data-processing system, in accordance with a preferred embodiment of the present invention. As shown, L2 cache controller 31 has four signal inputs-mode select input 32, address bus input 33, Add_Val input 34, and tag input 35.

Mode select input 32 selects one of the two preferred modes of operation for an associated L2 cache. This mode selection allows the associated L2 cache to be operated under a shared mode or a private mode, as detailed supra. The mode selection signal may be controlled by either software or hardware as it is deemed appropriate for a specific application. Address bus input 33 receives real addresses from the system bus. Add_Val input 34 indicates when an address is valid. An assertion of Add_Val 34 allows an incoming address received at address bus input 33 to be read by L2 cache controller 31. Tag input 35 is for the input of a tag that is associated with the address at address bus input 33 and identifies the source of the address.

As shown, the mode select signal is combined with a decode logic signal from decode logic 36 via an OR gate 37 to provide a qualifying signal. This qualifying signal is then combined with an address valid signal via an AND gate 38 to provide a true address valid signal to be input to Add_Val input 34. As a preferred embodiment of the present invention, a selection of a private mode is indicated when the mode select signal has a value of logical "1" and a selection of a shared mode is indicated when the mode select signal has a value of a logical "0". When the mode select signal is a logical "1", the decode logic signal from decode logic 36 is essentially a don't care such that the address valid signal is never gated and L2 cache controller will be presented with any valid address at address bus input 33. This means the L2 cache is operating in private mode, and the L2 cache can store data associated with any address in the system memory.

On the contrary, when the mode select signal is a logical "0," decode logic signal from decode logic 36 dictates whether or not an address on address bus input 33 should be made visible to L2 cache controller 31. In the shared mode, each of the L2 caches within the SMP data-processing system can store only a portion of the contiguous address space of the system memory. Hence, decode logic 36 will determine whether or not the incoming address should be presented to the associated L2 cache. Only when the address is within the valid address space will L2 cache controller 31 be accessed. If there are four L2 cache controllers (i.e., four L2 caches also) within the SMP data-processing system, only one of the four L2 cache controllers will have the address valid signal asserted at any given time so that data can be stored in its associated L2 cache.

In addition, as a preferred embodiment of the present invention, a system memory of a SMP data-processing system (such as system memory 18 of SMP data-processing system 10 shown in FIG. 1) is divided into a multiple number of partial system memories. An aggregate of contents within all of the partial system memories equals to contents of the system memory. Referring back to FIG. 2, system memory 18 from FIG. 1 is divided into partial system memories 18a–18n. The aggregate of contents stored in each of partial system memories 18a–18n is equal to the contents of system memory 18 at all times, had system memory 18 were utilized instead of partial system memories 18a–18n. The decode logic for partial system memories 18a–18n may contain a typical address bit-decode function and/or an address hashing function.

After the division of the system memory, each of the partial system memories is physically but not logically associated with one of the processing units within the SMP data-processing system. Preferably, each of the partial system memories is associated with a processing unit via a memory controller. As shown, each of partial system memories 18a–18n is coupled to one of processing units 21a–21n via one of the corresponding memory controllers 17a–17n. Generally speaking, each of memory controllers 17a–17n is similar to memory controller 17 shown in FIG. 1.

The size of each of partial system memories is preferably to be the size of the total system memory divided by the number of processing units within the entire SMP data-processing system. For example, if system memory 18 was about 4 GBytes originally and there are four processing units within SMP data-processing system 20, then each of the four partial system memories is approximately one GByte in size. The latency associated with accessing each level of the memory hierarchy is typically one processor-clock cycle for accessing a primary cache and 50 processor-clock cycles for accessing a partial system memory connected directly to a data-requesting processing unit, and approximately 65 processor-clock cycles for accessing non-directly connected partial system memories.

In addition, each of memory controllers 17a–17n includes address decoding logic to determine the portion(s) of the system memory covered by an associated partial system memory such that the address space of the total system memory will be evenly covered. The distribution of the address spaces among partial system memories 18a–18n may be determined by utilizing an apparatus very similar to that illustrated in FIG. 3 for the cache controller, except that there is no (private/shared) mode select. For each of memory controller 17a–17n, the decode logic could contain address range detection and/or one or more address decode algorithms, including a typical address bit-decode algorithm or an address hashing algorithm. The method of address decoded utilized can also be mode-selectable. It is important to note the address decoding method used for partial system memories 18a–18n does not have to be the same as that used for the L2 caches operated in a shared mode. Furthermore, each of partial system memories 18a–18n may or may not be covering a contiguous address space of the total system memory. In addition, there is no duplication of data among partial system memories 18a–18n.

As has been described, the present invention provides a scalable symmetric multiprocessor data-processing system. One of the major benefits of the present invention is scalability. As more processing units are added to the SMP data-processing system, additional system memory space can added without any extensive renovation of the system itself. In addition, the present invention provides an intrinsic flexibility to the SMP data-processing system because not all the partial system memories within the system has to be populated such that any one of the partial system memories can be turned off. Also, the bus traffic between the system memory and its controller has now been distributed among all the partial system memories and more parallel bus traffic is expected. From a system performance standpoint, the present invention enables more memory control resources (e.g., read/write queues) to be available, and provides a lower latency for the access to the system memory on one out of n access on the average, where n is the total number of partial system memories within the SMP data-processing system.

While the invention has been particularly shown and described with reference to a preferred embodiment, it will be understood by those skilled in the art that various changes in form and detail may be made therein without departing from the spirit and scope of the invention.

What is claimed is:

1. A scalable symmetric multiprocessor data-processing system having a system memory, said data-processing system comprising:

a plurality of processing units, wherein each of said plurality of processing units includes a cache memory for storing a subset of data contained within said system memory;

a cache controller included within each one of said processing units for controlling an associated one of said cache memories, wherein said cache controller includes a mode select to allow an associated cache memory to be selectively operated under either a first mode or a second mode for indicating an address space of said system memory in which one of said cache memories can store data; and a plurality of partial system memories, wherein each of said plurality of partial system memories is associated with a respective one of said plurality of processing units, wherein an aggregate of contents within all of said plurality of partial system memories forms said system memory.

2. The scalable symmetric multiprocessor data-processing system according to claim 1, wherein said first mode enables all of said cache memories combined to represent an entire address space of said system memory.

3. The scalable symmetric multiprocessor data-processing system according to claim 1, wherein said second mode enables each of said cache memories to represent an entire address space of said system memory.

4. The scalable symmetric multiprocessor data-processing system according to claim 1, wherein said plurality of processing units are substantially identical to each other.

5. The scalable symmetric multiprocessor data-processing system according to claim 1, wherein each of said plurality of partial system memories is associated with one of said plurality of processing units via a memory controller.

* * * * *